United States Patent [19]

Peterson

[11] 3,822,900

[45] July 9, 1974

[54] ANTI-THEFT TRAILER HITCH

[76] Inventor: Fred M. Peterson, 3233 Caddo Trail, Fort Worth, Tex. 76135

[22] Filed: Dec. 11, 1972

[21] Appl. No.: 313,627

[52] U.S. Cl. .............................................. 280/507
[51] Int. Cl. ............................................. B60d 7/00
[58] Field of Search............ 280/507, 491 R, 491 A, 280/491 B, 511, 504

[56] References Cited
UNITED STATES PATENTS

| | | | |
|---|---|---|---|
| 3,695,631 | 10/1972 | Schwaiger | 280/507 |
| 3,738,684 | 6/1973 | Lusk | 280/491 R |

*Primary Examiner*—Robert R. Song
*Attorney, Agent, or Firm*—Charles M. Woodward

[57] ABSTRACT

An anti-theft hitch for trailers and other towable vehicles which employ a ball and socket or equivalent hitch, wherein a ball or like member normally attached to the prime mover at its bumper or rear frame fits into a socket or other receptacle attached to the frame of the towed vehicle and is secured thereto for towing, the socket member on the towed vehicle being rotatively reversible and lockable in the reversed position so that it cannot mate with the prime mover ball.

10 Claims, 2 Drawing Figures

PATENTED JUL 9 1974 3,822,900

ANTI-THEFT TRAILER HITCH

BACKGROUND OF THE INVENTION

1. Field of the Invention

This invention relates generally to hitching devices and more particularly to a hitch for a towed vehicle which will aid in preventing unauthorized towing or theft of the towed vehicle.

2. Description of the Prior Art

Although prior art devices dealing with improved trailer hitches are quite numerous, and considerable effort has been devoted to preventing the unauthorized removal of such vehicles, none has accomplished the provision of both a strong, simple, rugged hitch which renders the trailer virtually theft-proof from removal by any normally conventional means. Exemplary of such prior art devices is U.S. Pat. No. 3,695,631 issued Oct. 3, 1972 for an "Anti-Theft Device for Trailer," wherein the trailer frame is provided with a vertically swinging stand which is lockable in its "down" position to raise the socket member of the hitch above the plane of normal attachment to the prime mover. Another state of the art device previously applied to trailer hitches, and superficially the closest in conceptual stricture to the present invention, although useable inherently only for its esthetic value, is illustrated in the U.S. Pat. No. 2,544,185 for "Trailer Hitch" wherein the ball portion of the hitch is rotatable and horizontally slideable in order to fit underneath the prime mover when not in use.

SUMMARY OF THE INVENTION

It is a general object of the invention to provide a rotatable trailer hitch which is simple in construction, rugged, esthetically pleasing, and capable of rendering the unauthorized towing of the trailer virtually impossible by conventional means.

A more specific object of the invention is the provision of an anti-theft hitch for a towable vehicle which has a socket or other receptacle member which is adapted to mate with a ball or like member attached to the prime mover wherein the socket member opens downwardly in the tow position and is rotatable about its longitudinal axis when in the stationary i.e., nontowable, position so that it opens in a direction other than downwardly whereby the prime mover ball will not mate with the trailer hitch socket.

A further and more specific object of the present invention is the provision for a trailer vehicle of a forwardly extending tow bar having a portion thereof carrying a socket member adapted to mate with a prime mover attached ball member offset from the portion of the tow bar attached or secured to the trailer, the tow bar rotatable so that in the tow configuration the forward offset portion is substantially level planarly with the prime mover ball portion and the socket carried thereby is oriented to mate with the ball, and when in the stand configuration the tow bar forward portion forms means for a ground support member, the forward portion is grossly misaligned planarly with the vehicle ball, and the socket opens upwardly.

DESCRIPTION OF THE PREFERRED EMBODIMENT

Figure 1:
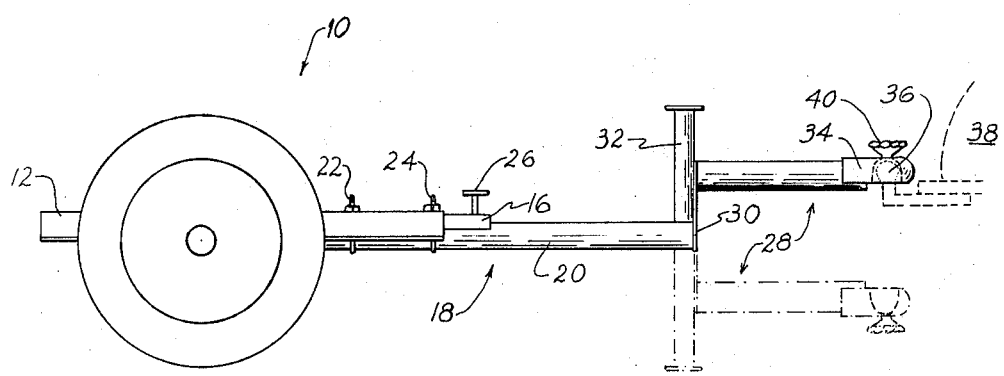
FIG. 1 is a side view, partially in section of the trailer hitch of the present invention.
Figure 2:
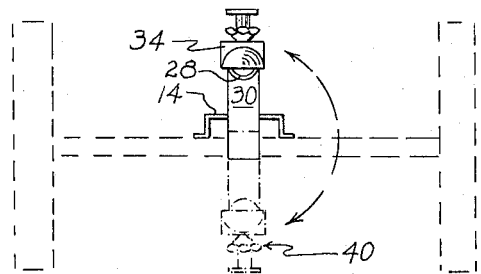
FIG. 2 is a front elevational view of the present invention in the tow and stand positions.

Having reference to both FIGS. 1 and 2, there is shown a trailer 10 having frame member 12, which in this preferred embodiment comprises a substantially U-shaped channel element having a web portion 14 to which is attached a second smaller channel member 16 operative as a guiding and clamping element. Tow bar 18 has a portion 20 thereof extended along channel member 16 and secured thereto by U-bolts 22, 24, and lockable in position by screw 26 or other means.

Obviously tow bar 18 may be longitudinally permanently positioned or it may telescope into and out of frame member 12. Tow bar 18 also comprises socket portion 28 which is offset planarly from portion 20 by vertical offset plate 30 to which is attached a permanently fixed or adjustable standard member 32 in any conventional manner for engagement with the ground. Portion 28 of tow bar 18 carries on its forward end socket member 34 adapted to mate with ball joint 36 which is attached to prime mover 38, both latter being shown in phantom. A conventional securing clamp (not shown) actuated by screw handle 40 secures ball joint 36 within socket member 34. As shown also in phantom line, when the trailer is in the stand position, portion 28 of the tow bar 18 is displaced downwardly from portion 20 thereof, offset plate 30 and stand 32 operating to keep the trailer level, while portion 28 will no longer "match" the height of ball joint 36, while socket member 34 opens upwardly and no longer mates with ball joint 36. Thus, in order to tow the trailer 10 in this configuration, it would have to be "cocked" at an obvious and visually apparent angle, and a means other than the socket 34 would have to be employed to attach it to the prime mover, also a most apparent or "suspicious" circumstance.

Obviously many variations and modifications may be employed without departing from the scope of the present invention. It is not necessary to offset the forward and rearward portions of the tow bar, while numerous "locking" devices for securing the tow bar in a particular orientation may be employed within the state of the art.

Having now described the preferred embodiment of my invention,

I claim:

1. An anti-theft trailer hitch comprising, in combination, a tow bar adapted for rotational attachment to a towable vehicle on a first end so that said tow bar is selectively rotatable about an axis longitudinal of said tow bar and having means on the other end thereof for interfitting engagement with and securement to prime mover mounted attachment means, said interfitting and securement means mating with the prime mover mounted attachment means when said tow bar is in a first position and opposed to mating therewith when said tow bar is rotated to a second position.

2. The anti-theft trailer hitch as defined in claim 1 wherein:

said means for interfitting engagement and securement with the prime mover mounted attachment means comprises a socket which opens downwardly for attachment to the prime mover mating means and opens in a direction other than downwardly when said tow bar has been rotated to the said second position.

3. The anti-theft device as defined in claim 1 wherein:

said means for interfitting engagement and securement with the prime mover mounted attachment means comprises a receptacle adapted for receiving a pin-like member so that when said tow bar is in said first position the pin-like member is substantially surrounded thereby, and when in said second position said receptacle is oriented in a manner to prevent the pin-like member entry thereinto.

4. The device as defined by claim 2 wherein said tow bar comprises first and second portions offset one from the other by a connecting portion, said first portion adapted to be rotatably secured to the trailer, said second portion carrying said socket and operative on rotation from the said first position to place said second portion in a plane grossly misaligned vertically with the prime mover attachment means, said socket in said first position opening downwardly for mating with the prime mover attachment means, and in said second position oriented to open in a direction other than downwardly.

5. The device as defined in claim 4 wherein said portion connecting said first and second portions of said tow bar includes a stand means which is oriented to engage the ground when said tow bar is in said second position, and to be rotated away from the ground when said tow bar is in the said first position.

6. The anti-theft device as defined in claim 1, wherein:

said tow bar on the end adapted for attachment to a trailer includes means therein for locking said tow bar in a particular orientation relative to the trailer, and said tow bar is longitudinally adjustable in relation to the trailer.

7. The device as defined by claim 6, wherein:

A. said means for interfitting engagement and securement with the prime mover mounted attachment means comprises a socket which opens downwardly for attachment to the prime mover mating means and opens in a direction other than downwardly when said tow bar has been rotated to the said second position, B. said tow bar comprises first and second portions offset one from the other by a connecting portion, said first portion adapted to be rotatably secured to the trailer, said second portion carrying said socket and operative on rotation from the said first position to place said second portion in a plane grossly vertically misaligned with the prime mover attachment means, said socket in said first position opening downwardly for mating with the prime mover attachment means, and in said second position oriented to open in a direction other than downwardly.

8. The device as defined in claim 7 wherein:

said connecting portion between said first and second portions of said tow bar includes a stand means which is oriented to engage the ground when said tow bar is in said second position, and to be rotated away from the ground when said tow bar is in the said first position.

9. An anti-theft trailer hitch comprising, in combination, a tow bar adapted for rotational attachment to a towable vehicle on a first end so that said tow bar is selectively rotatable about the longitudinal axis of said first end and having means on the other end thereof for interfitting engagement with and securement to prime mover mounted attachment means, said interfitting and securement means mating with the prime mover mounted attachment means when said tow bar is properly oriented, said tow bar comprising first and second portions offset from one another by an intermediate portion wherein said second portion is substantially planarly aligned with the prime mover mounted attachment means when said tow bar is in a first position, and is grossly misaligned therewith when said tow bar is rotated to a second position whereby the vehicle to which said tow bar is attached assumes a grossly angled position.

10. The anti-theft trailer hitch as defined in claim 9 wherein:

said means for interfitting engagement with and securement to prime mover mounted attachment means comprises means receiving and securable to a ball-like member attached to the prime mover, said means including a member receiving the ball-like member when said tow bar is in a first or trailing position, said member receiving the ball-like member of the prime mover being misaligned and disoriented when said tow bar has been rotated to said second position, and means cooperatively associated with the trailer and said tow bar operative to lock said tow bar in a particular position or orientation.

* * * * *